(12) United States Patent
Leonard et al.

(10) Patent No.: US 7,490,074 B1
(45) Date of Patent: Feb. 10, 2009

(54) MECHANISM FOR SELECTIVELY PROVIDING MOUNT INFORMATION TO PROCESSES RUNNING WITHIN OPERATING SYSTEM PARTITIONS

(75) Inventors: Ozgur C. Leonard, San Mateo, CA (US); Andrew G. Tucker, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 959 days.

(21) Appl. No.: 10/767,235

(22) Filed: Jan. 28, 2004

Related U.S. Application Data

(60) Provisional application No. 60/469,558, filed on May 9, 2003.

(51) Int. Cl.
G06F 7/00 (2006.01)
G06F 17/30 (2006.01)
(52) U.S. Cl. ............................................. 707/1; 707/10
(58) Field of Classification Search ........................ None
See application file for complete search history.

(56) References Cited

U.S. PATENT DOCUMENTS

| | | |
|---|---|---|
| 5,155,809 A | 10/1992 | Baker et al. |
| 5,283,868 A | 2/1994 | Baker et al. |
| 5,291,597 A | 3/1994 | Shorter et al. |
| 5,325,517 A | 6/1994 | Baker et al. |
| 5,325,526 A | 6/1994 | Cameron et al. |
| 5,437,032 A | 7/1995 | Wolf et al. |
| 5,590,314 A | 12/1996 | Ueno et al. |
| 5,784,706 A | 7/1998 | Oberlin et al. |

(Continued)

FOREIGN PATENT DOCUMENTS

EP 389151 A2 9/1990

(Continued)

OTHER PUBLICATIONS

Communications from the ACM (ISSN: 0001-0782) vol. 44, Issue 2 (2001) entitled "An Operating System Approach to Securing E-Services" by Chris Dalton and Tse Huong Choo, ACM Copyright Notice, © 2001, (8 pgs).

(Continued)

*Primary Examiner*—Baoquoc N To
(74) *Attorney, Agent, or Firm*—Bobby K. Truong; Hickman Palermo Truong & Becker LLP

(57) ABSTRACT

A mechanism is disclosed for selectively providing mount information to processes running within operating system partitions. In one implementation, a non-global operating system partition is created within a global operating system environment. A file system is maintained for this non-global partition. This file system comprises zero or more mounts, and may be part of a larger, overall file system. When a process running within the non-global partition requests information pertaining to mounts, a determination is made as to which partition the process is running in. Because the process is running within the non-global partition, only selected information is provided to the process. More specifically, only information pertaining to the mounts that are within the file system maintained for the non-global partition is provided to the process. By doing so, the process is limited to viewing only those mounts that are part of the non-global partition's file system.

36 Claims, 6 Drawing Sheets

U.S. PATENT DOCUMENTS

| | | | |
|---|---|---|---|
| 5,841,869 | A | 11/1998 | Merkling et al. |
| 5,845,116 | A | 12/1998 | Saito et al. |
| 5,963,911 | A | 10/1999 | Walker et al. |
| 6,064,811 | A | 5/2000 | Spilo et al. |
| 6,074,427 | A | 6/2000 | Fought et al. |
| 6,075,938 | A | 6/2000 | Bugnion et al. |
| 6,279,046 | B1 | 8/2001 | Armstrong et al. |
| 6,289,462 | B1 | 9/2001 | McNabb et al. |
| 6,438,594 | B1 | 8/2002 | Bowman-Amuah |
| 6,557,168 | B1 | 4/2003 | Czajkowski |
| 6,633,963 | B1 | 10/2003 | Ellison et al. |
| 6,681,238 | B1 | 1/2004 | Brice et al. |
| 6,681,258 | B1 | 1/2004 | Ratcliff et al. |
| 6,701,460 | B1 | 3/2004 | Suwandi et al. |
| 6,725,457 | B1 | 4/2004 | Priem et al. |
| 6,738,832 | B2 | 5/2004 | Burr et al. |
| 6,792,514 | B2 | 9/2004 | Kapoor et al. |
| 6,813,766 | B2 | 11/2004 | Hay |
| 6,859,926 | B1 | 2/2005 | Brenner et al. |
| 6,944,699 | B1 | 9/2005 | Bugnion et al. |
| 6,957,435 | B2 | 10/2005 | Armstrong et al. |
| 6,961,941 | B1 | 11/2005 | Nelson et al. |
| 6,993,762 | B1 | 1/2006 | Pierre |
| 7,051,340 | B2 | 5/2006 | Fisher et al. |
| 7,076,634 | B2 | 7/2006 | Lambeth et al. |
| 7,095,738 | B1 | 8/2006 | Desanti |
| 7,096,469 | B1 | 8/2006 | Kubala et al. |
| 7,188,120 | B1 | 3/2007 | Leonard et al. |
| 2002/0069369 | A1 | 6/2002 | Tremain |
| 2002/0083367 | A1* | 6/2002 | McBride et al. ............... 714/15 |
| 2002/0120660 | A1 | 8/2002 | Hay et al. |
| 2002/0156824 | A1 | 10/2002 | Armstrong et al. |
| 2002/0161817 | A1 | 10/2002 | Dorofeev et al. |
| 2002/0173984 | A1 | 11/2002 | Robertson et al. |
| 2002/0174215 | A1 | 11/2002 | Schaefer |
| 2003/0014466 | A1 | 1/2003 | Berger et al. |
| 2003/0069939 | A1 | 4/2003 | Russell |
| 2004/0010624 | A1 | 1/2004 | Garofalo et al. |
| 2004/0162914 | A1 | 8/2004 | St. Pierre et al. |
| 2004/0210760 | A1 | 10/2004 | McGrath et al. |
| 2004/0215848 | A1 | 10/2004 | Craddock et al. |
| 2005/0021788 | A1* | 1/2005 | Tucker et al. ............... 709/229 |

FOREIGN PATENT DOCUMENTS

| | | |
|---|---|---|
| EP | 1043658 A1 | 10/2000 |
| EP | 1 253 516 A2 | 10/2002 |
| EP | 1282038 A2 | 2/2003 |
| EP | 1300766 A | 4/2003 |
| WO | WO 00/45262 A2 | 8/2000 |

OTHER PUBLICATIONS

Sun Microsystems, Inc. entitled Server Virtualization with Trusted Solaris™ 8 Operating Environment, by Glenn Faden, Sun BluePrints™ OnLine—Feb. 2002, http://www.sun.com/blueprints, (21 pgs).

Network Working Group entitled "IP Version 6 Addressing Architecture", by R. hinden, Nokia, S. Deering, Cisco System, dtd Jul. 1998, (28 pgs).

IBM entitled Partitioning for the IBM eserver pSeries 690 System, © Copyright IBM Corp. 2001 (12 pgs).

IBM System Partitioning on IBM eserver xSeries Servers entitled "Effective Server Consolidation and Resource Management with System Partitioning" by Mark T. Chapman, IBM Server Group, dtd Dec. 2001, (23 pgs).

Virtual Private Servers and Security Contexts, dtd May 10, 2004, http://www.solucorp.qc.ca/miscprj/s_content.hc?prjstate=1&nodoc=0, (2 pgs).

SunSoft, a Sun Microsystems, Inc. Business entitled "File System Administration", © 1994 Sun Microsystems, Inc., (62 pgs).

Jails: Confining the omnipotent root., by Poul-Henning Kamp and Robert N.M. Watson, entitled "The FreeBSD Project", http://www.servetheweb.com/, (15 pgs).

U.S. Appl. No. 10/833,474, filed Apr. 27, 2004.
U.S. Appl. No. 10/767,118, filed Jan. 28, 2004.
U.S. Appl. No. 10/767,117, filed Jan. 28, 2004.
U.S. Appl. No. 10/766,094, filed Jan. 27, 2004.
U.S. Appl. No. 10/744,360, filed Dec. 22, 2003.
U.S. Appl. No. 10/763,147, filed Jan. 21, 2004.
U.S. Appl. No. 10/769,415, filed Jan. 30, 2004.
U.S. Appl. No. 10/761,622, filed Jan. 20, 2004.
U.S. Appl. No. 10/767,003, filed Jan. 28, 2004.
U.S. Appl. No. 10/762,067, filed Jan. 20, 2004.
U.S. Appl. No. 10/762,066, filed Jan. 20, 2004.
U.S. Appl. No. 10/771,827, filed Feb. 3, 2004.
U.S. Appl. No. 10/771,698, filed Feb. 3, 2004.
U.S. Appl. No. 10/768,303, filed Jan. 29, 2004.

European Search Report from the European Patent Office for Foreign Patent Application No. 04252690.5 (3 pgs.).

Claims As Filed in European Patent Application No. 04252690.5 (6 pgs.).

Official Action from EPO for foreign patent application No. 04 252 690.5—2211 dated Jun. 10, 2005 (6 pgs)—attached.

Current Claims in EPO patent application No. 04 252 690.5—2211 (9 pgs)—attached.

European Patent Office, "European Search Report," application No. 04252689.7, mailing date Jul. 28, 2005, 3 pages.

Current Claims, European patent application 04252689.7, 6 pages.

Sun Microsystems, "Sun Enterprise™ 1000 Server: Dynamic System Domains," White Paper Online, Feb. 26, 2003, retrieved from the internet at <http://www.sun.com/servers/highend/whitepapers/domains.html?facet=-1>, retrieved on Jun. 21, 2005, XP-002332946, 7 pages.

Official Action from EPO for foreign patent application No. 04 252 690.5—2211 dated Nov. 23, 2005 (5 pgs)—attached.

Current Claims in EPO patent application No. 04 252 690.5—2211 (9 pgs)—attached.

Hewlett-Packard, "Installing and Managing HP-UX Virtual Partitions (vPars)", Third Edition, Part No. T1335-90018, Copyright Hewlett-Packard Company, Nov. 2002, pp. 1-4, 17-44, 72-75, and 157-161.

Hope, Paco, "Using Jails in FreeBSD for Fun and Profit", ;Login: The Magazine of Usenix and Sage, vol. 27, No. 3, Jun. 2002, 9 pages.

Kamp, Poul-Henning, "Rethinking / dev and devices in the UNIX kernel", BSDCon 2002 Paper, retrieved from website <http://www.usenix.org/events/bsdcon02/full_papers/kamp/kamp_html/index.html> Printed May 1, 2007, 18 pages.

Thompson, K., "UNIX Implementation", Bell Laboratories, The Bell System Technical Journal, 1978, pp. 1-9.

Czajkowski, G., "Application isolation in the Java Virtual Machine", 2000, ACM Press, Proceedings of the 15th ACM SIGPLAN Conference on Object-Oriented Programming, Systems, Languages, and Applications, pp. 354-366.

Czajkowski, G., "Multitasking without compromise: a virtual machine evolution", ACM Press, Proceedings of the 16th ACM SIGPLAN Conference on Object Oriented Programming, Systems, Languages, and Applications, dated Oct. 2001, pp. 125-138.

Osman, S., et al., "The design and implementation of Zap: a system for migrating computing environments", SIGOPS Operating System, Rev. 36, SI, dated Dec. 2000, pp. 361-376.

Presotto et al., "Interprocess Communication in the Ninth Edition Unix System", John Wiley & Sons, Ltd., dated Mar. 1990, 4 pages.

Stevens, "Advanced programming in the Unix Environment", Addison-Wesley, 1993, pp. 427-436.

Watson, "TrustedBSD—Adding Trusted Operating System Features to FreeBSD", The USENIX Association, 2001, 14 pages.

Noordende et al., "Secure and Portable Confinement of Untrusted Programs", ACM, 2002, 14 pages.

Hope, "Using Jails in FreeBSD for fun and profit", ;Login: The Magazine of USENIX &SAGE, vol. 27, No. 3, dated Jun. 2002, pp. 48-55.

Mc Dougall, Richard, et al., "Resource Management", Prentice Hall, 1999, 25 pages.

European Patent Office, "Communication pursuant to Article 94(3) EPC", Foreign application No. 04 252 690.5—2211, 5 pages.

Current Claims, Foreign application No. 04 252 690.5—2211, 9 pages.

European Patent Office, "Result of Consultation", Application No. 04252689.7-1243, dated Aug. 11, 2008, 2 pages.

Claims, Application No. 04252689.7-1243, 5 pages.

* cited by examiner

MECHANISM FOR SELECTIVELY PROVIDING MOUNT INFORMATION TO PROCESSES RUNNING WITHIN OPERATING SYSTEM PARTITIONS

RELATED APPLICATIONS

This application claims priority to U.S. Provisional Application Ser. No. 60/469,558, filed May 9, 2003, entitled OPERATING SYSTEM VIRTUALIZATION by Andrew G. Tucker, et al., the entire contents of which are incorporated herein by this reference.

BACKGROUND

In a typical computer, an operating system executing on the computer maintains an overall file system. This overall file system provides the infrastructure needed to enable items, such as directories and files, to be created, stored, and accessed in an organized manner.

In addition to having directories and files, the overall file system may also comprise one or more mounts. These mounts enable devices, other file systems, and other entities to be "mounted" onto particular mount points of the overall file system to enable them to be accessed in the same manner as directories and files. For example, a floppy disk drive, a hard drive, a CDROM drive, etc., may be mounted onto a particular mount point of the overall file system. Similarly, a file system such as a process file system (ProcFS) or a network file system (NFS) may be mounted onto a particular mount point of the overall file system. Once mounted, these entities (referred to herein as "mounted entities") may be accessed in the same manner (from the standpoint of a user) as any other directory or file. Thus, they are in effect incorporated into the overall file system.

The mounted entities may be accessed by processes running on the computer. To access a mounted entity, a process may submit a request to the operating system for a list of all of the mounts in the overall file system. When the operating system returns the requested list, the process may select one of the mounts, and submit a request to the operating system to access the mounted entity on that mount. Barring some problem or error, the operating system will grant the request; thus, the process is able to access the mounted entity. Such an access mechanism works well when all processes are allowed to have knowledge of and hence, access to, all mounts in the overall file system. In some implementations, however, it may not be desirable to allow all processes to have knowledge of, and access to, all mounts. In such implementations, the above access mechanism cannot be used effectively.

SUMMARY

In accordance with one embodiment of the present invention, there is provided a mechanism for selectively providing mount information to processes running within operating system partitions. By providing mount information in a selective manner, it is possible to control which processes are allowed to view which mounts.

In one embodiment, a non-global partition is created within a global operating system environment provided by an operating system. This non-global partition (which may be one of a plurality of non-global partitions within the global operating system environment) serves to isolate processes running within the partition from other non-global partitions within the global operating system environment.

A file system is maintained for this non-global partition. This file system may comprise zero or more mounts, and may be part of a larger, overall file system maintained for the global operating system environment. The overall file system may comprise additional mounts, which are not part of the file system maintained for the non-global partition.

When a process running within the non-global partition requests information pertaining to mounts, a determination is made as to which partition the process is running in. Because the process is running within the non-global partition, only selected information is provided to the process. More specifically, in one embodiment, only information pertaining to the mounts that are within the file system maintained for the non-global partition is provided to the process. Information pertaining to mounts outside the file system maintained for the non-global partition is not provided. As a result, the process is limited to viewing only those mounts that are part of the non-global partition's file system, which helps to enforce the file system boundaries of the non-global partition.

DETAILED DESCRIPTION OF EMBODIMENT(S)

Conceptual Overview

In some computer system implementations, it may be desirable to impose limits on which mounts may be viewed by which processes. To accommodate such implementations, one embodiment of the present invention provides a mechanism for selectively providing mount information to processes running within operating system partitions. An operational flow diagram showing a high-level overview of this embodiment is provided in FIG. 2.

Figure 2:
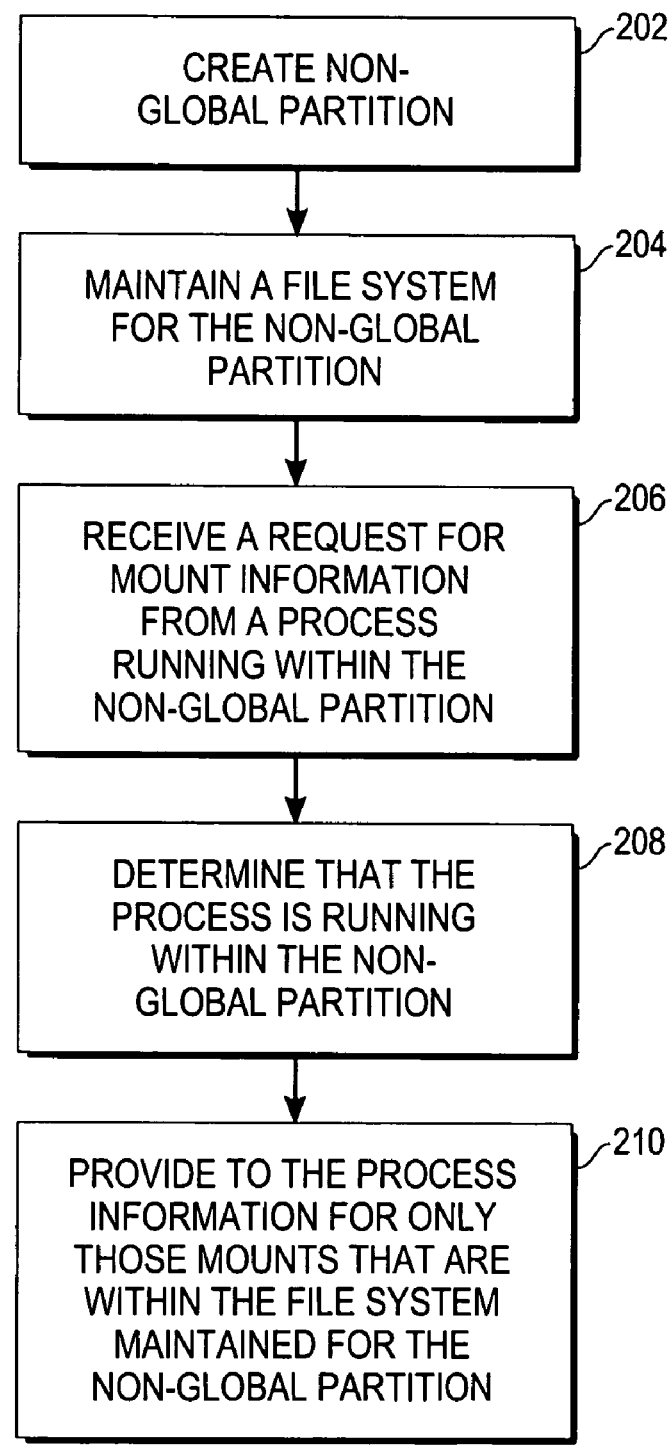
FIG. 2 is an operational flow diagram showing a high level overview of one embodiment of the present invention.

As shown in FIG. 2, a non-global partition is created (block 202) within a global operating system environment provided by an operating system. This non-global partition (which may be one of a plurality of non-global partitions within the global operating system environment) serves to isolate processes running within the partition from other non-global partitions within the global operating system environment. In one embodiment, processes running within this non-global partition may not access or affect processes running within any other non-global partition. Likewise, processes running in other non-global partitions may not access or affect processes running within this non-global partition.

A file system is maintained (block 204) for this non-global partition. This file system may comprise zero or more mounts, and may be part of a larger, overall file system maintained for the global operating system environment. The overall file system may comprise additional mounts, which are not part of the file system maintained for the non-global partition. In one embodiment, the file system maintained for this non-global partition may be accessed by processes running within this non-global partition, but not by processes running within any other non-global partition.

During regular operation, a process running within the non-global partition may request information pertaining to mounts. When such a request is received (block 206), a determination is made (block 208) as to which partition the process is running in. Because the process is running within the non-global partition, only selected information is provided to the process. More specifically, in one embodiment, only information pertaining to the mounts that are within the file system maintained for the non-global partition is provided (block 210) to the process. Information pertaining to mounts outside the file system maintained for the non-global partition is not provided. As a result, the process is limited to viewing only those mounts that are part of the non-global partition's file system (hence, the process can view only those mounts that it can access). In this manner, the file system boundaries of the non-global partition, as they relate to mounts, are enforced.

This embodiment will be described in greater detail in the following sections.

System Overview

Figure 1:
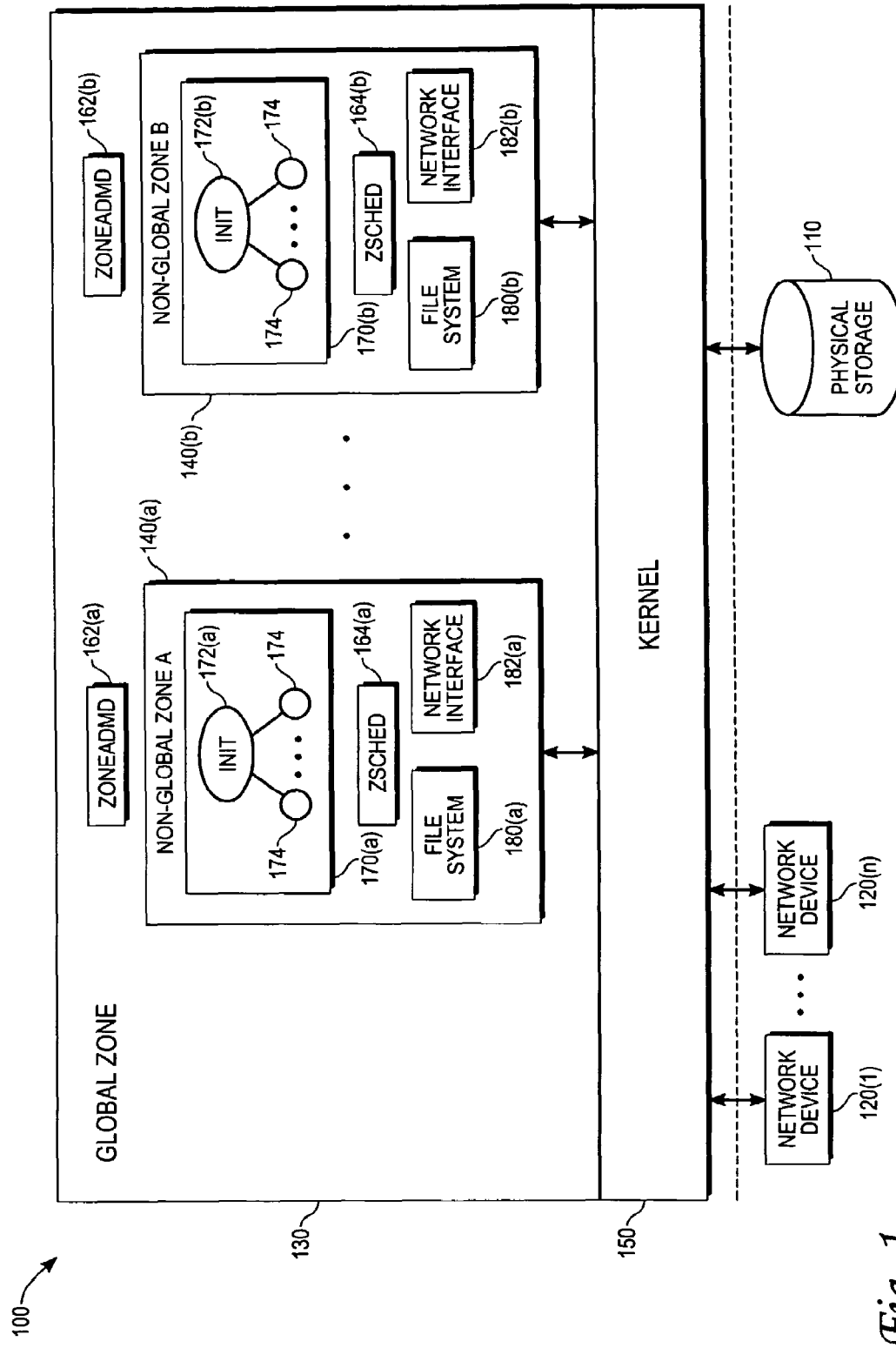
FIG. 1 is a functional block diagram of an operating system environment in accordance with one embodiment of the present invention.

FIG. 1 illustrates a functional block diagram of an operating system (OS) environment 100 in accordance with one embodiment of the present invention. OS environment 100 may be derived by executing an OS in a general-purpose computer system, such as computer system 600 illustrated in FIG. 6, for example. For illustrative purposes, it will be assumed that the OS is Solaris manufactured by Sun Microsystems, Inc. of Santa Clara, Calif. However, it should be noted that the concepts taught herein may be applied to any OS, including but not limited to Unix, Linux, Windows, MacOS, etc.

As shown in FIG. 1, OS environment 100 may comprise one or more zones (also referred to herein as partitions), including a global zone 130 and zero or more non-global zones 140. The global zone 130 is the general OS environment that is created when the OS is booted and executed, and serves as the default zone in which processes may be executed if no non-global zones 140 are created. In the global zone 130, administrators and/or processes having the proper rights and privileges can perform generally any task and access any device/resource that is available on the computer system on which the OS is run. Thus, in the global zone 130, an administrator can administer the entire computer system. In one embodiment, it is in the global zone 130 that an administrator executes processes to configure and to manage the non-global zones 140.

The non-global zones 140 represent separate and distinct partitions of the OS environment 100. One of the purposes of the non-global zones 140 is to provide isolation. In one embodiment, a non-global zone 140 can be used to isolate a number of entities, including but not limited to processes 170, one or more file systems 180, and one or more logical network interfaces 182. Because of this isolation, processes 170 executing in one non-global zone 140 cannot access or affect processes in any other zone. Similarly, processes 170 in a non-global zone 140 cannot access or affect the file system 180 of another zone, nor can they access or affect the network interface 182 of another zone. As a result, the processes 170 in a non-global zone 140 are limited to accessing and affecting the processes and entities in that zone. Isolated in this manner, each non-global zone 140 behaves like a virtual standalone computer. While processes 170 in different non-global zones 140 cannot access or affect each other, it should be noted that they may be able to communicate with each other via a network connection through their respective logical network interfaces 182. This is similar to how processes on separate standalone computers communicate with each other.

Having non-global zones 140 that are isolated from each other may be desirable in many implementations. For example, if a single computer system running a single instance of an OS is to be used to host applications for different competitors (e.g. competing websites), it would be desirable to isolate the data and processes of one competitor from the data and processes of another competitor. That way, it can be ensured that information will not be leaked between the competitors. Partitioning an OS environment 100 into non-global zones 140 and hosting the applications of the competitors in separate non-global zones 140 is one possible way of achieving this isolation.

In one embodiment, each non-global zone 140 may be administered separately. More specifically, it is possible to assign a zone administrator to a particular non-global zone 140 and grant that zone administrator rights and privileges to manage various aspects of that non-global zone 140. With such rights and privileges, the zone administrator can perform any number of administrative tasks that affect the processes and other entities within that non-global zone 140. However, the zone administrator cannot change or affect anything in any other non-global zone 140 or the global zone 130. Thus, in the above example, each competitor can administer his/her zone, and hence, his/her own set of applications, but cannot change or affect the applications of a competitor. In one embodiment, to prevent a non-global zone 140 from affecting other zones, the entities in a non-global zone 140 are generally not allowed to access or control any of the physical devices of the computer system.

In contrast to a non-global zone administrator, a global zone administrator with proper rights and privileges may administer all aspects of the OS environment 100 and the computer system as a whole. Thus, a global zone administrator may, for example, access and control physical devices, allocate and control system resources, establish operational parameters, etc. A global zone administrator may also access and control processes and entities within a non-global zone 140.

In one embodiment, enforcement of the zone boundaries is carried out by the kernel 150. More specifically, it is the kernel 150 that ensures that processes 170 in one non-global zone 140 are not able to access or affect processes 170, file systems 180, and network interfaces 182 of another zone (non-global or global). In addition to enforcing the zone boundaries, kernel 150 also provides a number of other services. These services include but are certainly not limited to mapping the network interfaces 182 of the non-global zones 140 to the physical network devices 120 of the computer system, and mapping the file systems 180 of the non-global zones 140 to an overall file system and a physical storage 110 of the computer system. The operation of the kernel 150 will be discussed in greater detail in a later section.

File System for a Non-Global Zone

As noted above, each non-global zone 140 has its own associated file system 180. This file system 180 is used by the processes 170 running within the associated zone 140, and cannot be accessed by processes 170 running within any other non-global zone 140 (although it can be accessed by a process running within the global zone 130 if that process has the appropriate privileges). To illustrate how a separate file system may be maintained for each non-global zone 140, reference will be made to FIGS. 3 and 4.

Figure 3:
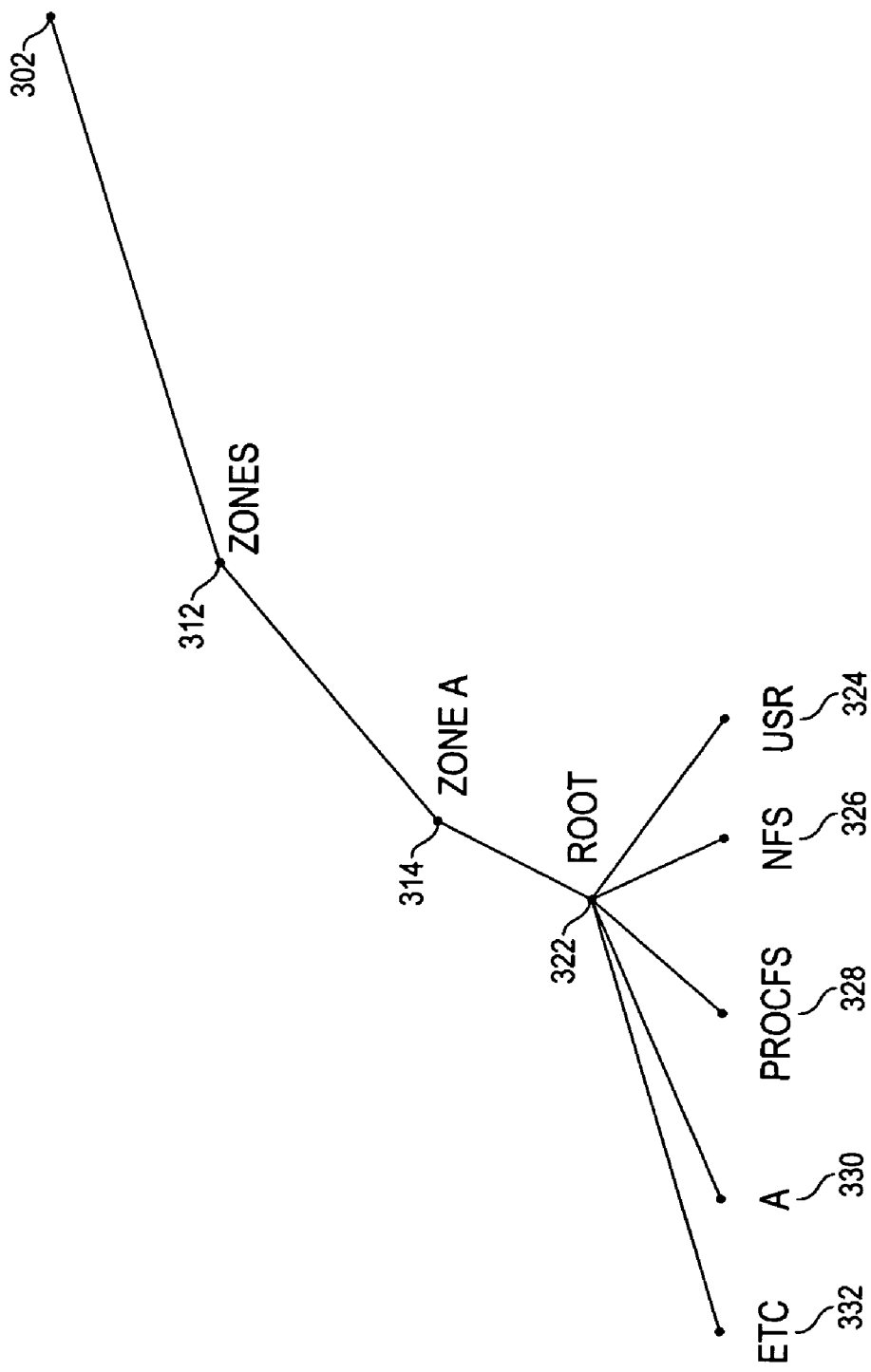
FIG. 3 shows, in tree format, a portion of an overall file system, which includes a file system for a particular operating system zone.

FIG. 3 shows, in tree format, a portion of an overall file system maintained by the kernel 150 for the global zone 130. This overall file system comprises a / directory 302, which acts as the root for the entire file system. Under this root directory 302 are all of the directories, subdirectories, files, and mounts of the overall file system.

As shown in FIG. 3, under the / directory 302 is a path to a root directory 322 of a file system 180 for a particular non-global zone 140. In the example shown, the path is /Zones/ZoneA/Root (as seen from the global zone 130), and the non-global zone is zone A 140(a) (FIG. 1). This root 322 acts as the root of the file system 180(a) for zone A 140(a), and everything underneath this root 322 is part of that file system 180(a). Because root 322 is the root of the file system 180(a) for zone A 140(a), processes 170(a) within zone A 140(a) cannot traverse up the file system hierarchy beyond root 322. Thus, processes 170(a) cannot see or access any of the directories above root 322, or any of the subdirectories that can be reached from those directories. To processes 170(a), it is as if the other portions of the overall file system did not exist.

Figure 4:
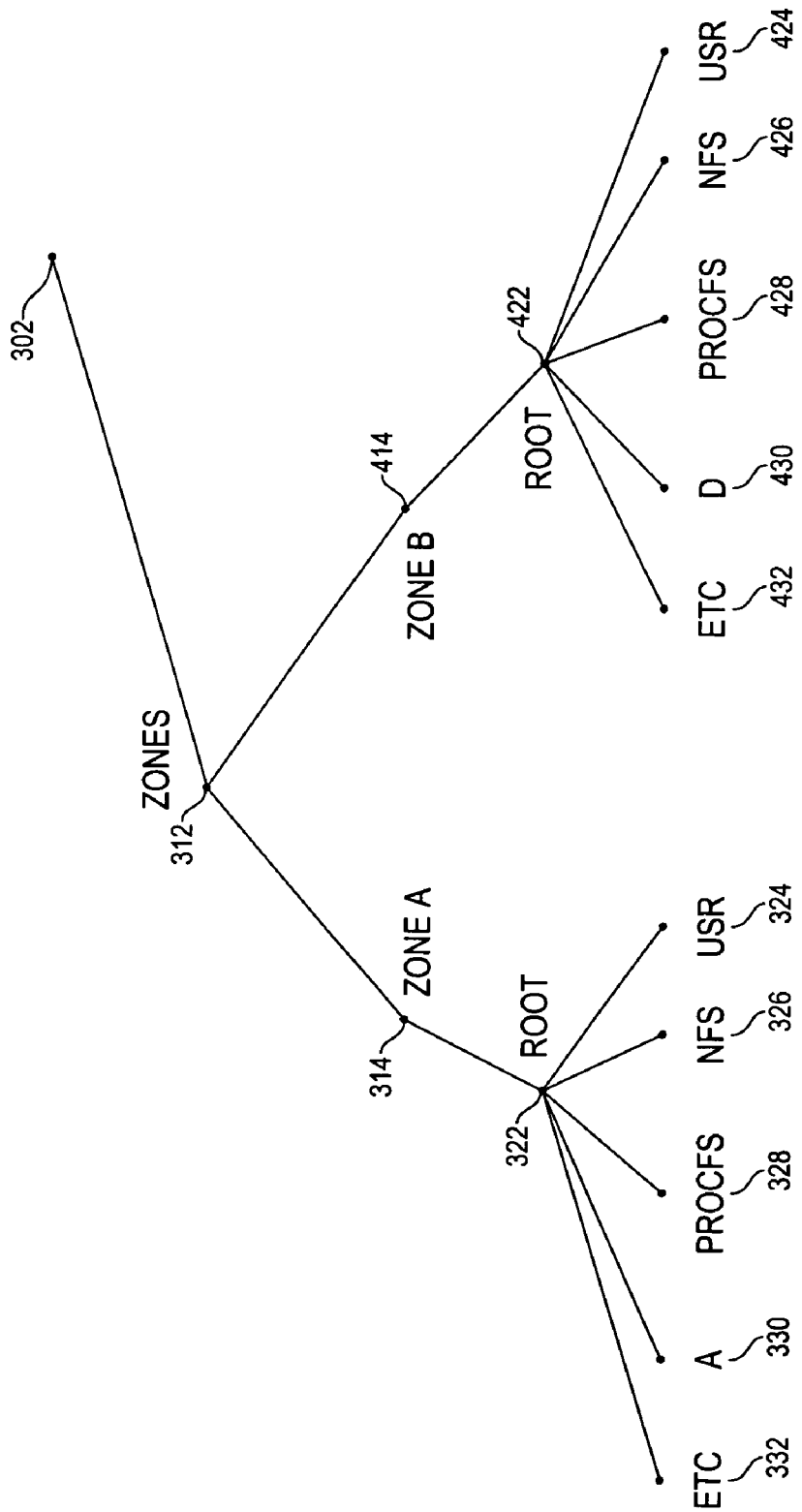
FIG. 4 shows the overall file system of FIG. 3, which further includes a file system for another operating system zone.

FIG. 4 shows the same overall file system, except that another file system for another non-global zone 140 has been added. In the example shown, the other non-global zone is zone B 140(b) (FIG. 1), and the path to the root 422 of the file system 180(b) for zone B 140(b) is /Zones/ZoneB/Root. Root 422 acts as the root of the file system 180(b) for zone B 140(b), and everything underneath it is part of that file system 180(b). Because root 422 is the root of the file system 180(b) for zone B 140(b), processes 170(b) within zone B 140(b) cannot traverse up the file system hierarchy beyond root 422. Thus, processes 170(b) cannot see or access any of the directories above root 422, or any of the subdirectories that can be reached from those directories. To processes 170(b), it is as if the other portions of the overall file system did not exist. By organizing the file systems in this manner, it is possible to maintain, within an overall file system maintained for the global zone 130, a separate file system 180 for each non-global zone 140. It should be noted that this is just one way of maintaining a separate file system for each non-global zone. Other methods may be used, and all such methods are within the scope of the present invention.

The root of a non-global zone's file system may have any number of directories, subdirectories, and files underneath it. Using root 322 as an example, these directories may include some directories, such as ETC 332, which contain files specific to a zone 140(a) (for example, program files that are to be executed within the zone 140(a)), and some directories, such as USR 324, which contain operating system files that are used by the zone 140(a). These and other directories and files may be included under the root 322, or a subdirectory thereof.

The root of a non-global zone's file system may also have one or more mounts underneath it. Put another way, one or more mount points may exist under the root (or a subdirectory thereof), on which entities may be mounted. Using root 322 as an example, a mount point A 330 may exist under root 322 on which a floppy drive may be mounted. A mount point ProcFS 328 may also exist on which a process file system (ProcFS) may be mounted. In addition, a mount point NFS 326 may exist on which a network file system (NFS) may be mounted (ProcFS and NFS are well known to those in the art and will not be explained in detail herein). Basically, any number of mount points, on which any number and any type of entities (e.g. devices, file systems, etc.) may be mounted, may exist under the root of a non-global zone's file system.

Mounts may exist in various other portions of the overall file system. For example, the file system 180(b) for Zone B 140(b) may have a mount point D 430 on which a CDROM drive may be mounted, a ProcFS mount point 428 on which a ProcFS may be mounted, and an NFS mount point 426 on which an NFS may be mounted. Mounts may also exist in other portions (not shown) of the overall file system, which are not within any file system of any non-global zone. Overall, mounts may exist in any part of the overall file system.

Non-Global Zone States

In one embodiment, a non-global zone 140 may take on one of four states: (1) Configured; (2) Installed; (3) Ready; and (4) Running. When a non-global zone 140 is in the Configured state, it means that an administrator in the global zone 130 has invoked an operating system utility (in one embodiment, zonecfg(1 m)) to specify all of the configuration parameters of a non-global zone 140, and has saved that configuration in persistent physical storage 110. In configuring a non-global zone 140, an administrator may specify a number of different parameters. These parameters may include, but are not limited to, a zone name, a zone path to the root directory of the zone's file system 180, specification of zero or more mount points and entities to be mounted when the zone is readied, specification of zero or more network interfaces, specification of devices to be configured when the zone is created, etc.

Once a zone is in the Configured state, a global administrator may invoke another operating system utility (in one embodiment, zoneadm(1 m)) to put the zone into the Installed state. When invoked, the operating system utility interacts with the kernel 150 to install all of the necessary files and directories into the zone's root directory, or a subdirectory thereof.

To put an Installed zone into the Ready state, a global administrator invokes an operating system utility (in one embodiment, zoneadm(1 m) again), which causes a zoneadmd process 162 to be started (there is a zoneadmd process associated with each non-global zone). In one embodiment, zoneadmd 162 runs within the global zone 130 and is responsible for managing its associated non-global zone 140. After zoneadmd 162 is started, it interacts with the kernel 150 to establish the non-global zone 140. In establishing a non-global zone 140, a number of operations are performed, including but not limited to creating the zone 140 (e.g. assigning a zone ID, creating a zone data structure, etc.), starting a zsched process 164 (zsched is a kernel process; however, it runs within the non-global zone 140, and is used to track kernel resources associated with the non-global zone 140), maintaining a file system 180, plumbing network interfaces 182, and configuring devices. These and other operations put the non-global zone 140 into the Ready state to prepare it for normal operation.

Putting a non-global zone 140 into the Ready state gives rise to a virtual platform on which one or more processes may be executed. This virtual platform provides the infrastructure necessary for enabling one or more processes to be executed within the non-global zone 140 in isolation from processes in other non-global zones 140. The virtual platform also makes it possible to isolate other entities such as file system 180 and network interfaces 182 within the non-global zone 140, so that the zone behaves like a virtual standalone computer. Notice that when a non-global zone 140 is in the Ready state, no user or non-kernel processes are executing inside the zone (recall that zsched is a kernel process, not a user process). Thus, the virtual platform provided by the non-global zone 140 is independent of any processes executing within the zone. Put another way, the zone and hence, the virtual platform, exists even if no user or non-kernel processes are executing within the zone. This means that a non-global zone 140 can remain in existence from the time it is created until either the zone or the OS is terminated. The life of a non-global zone 140 need not be limited to the duration of any user or non-kernel process executing within the zone.

After a non-global zone 140 is in the Ready state, it can be transitioned into the Running state by executing one or more user processes in the zone. In one embodiment, this is done by having zoneadmd 162 start an init process 172 in its associated zone. Once started, the init process 172 looks in the file system 180 of the non-global zone 140 to determine what applications to run. The init process 172 then executes those applications to give rise to one or more other processes 174. In this manner, an application environment is initiated on the virtual platform of the non-global zone 140. In this application environment, all processes 170 are confined to the non-global zone 140; thus, they cannot access or affect processes, file systems, or network interfaces in other zones. The application environment exists so long as one or more user processes are executing within the non-global zone 140.

After a non-global zone 140 is in the Running state, its associated zoneadmd 162 can be used to manage it. Zoneadmd 162 can be used to initiate and control a number of zone administrative tasks. These tasks may include, for example, halting and rebooting the non-global zone 140. When a non-global zone 140 is halted, it is brought from the Running state down to the Installed state. In effect, both the application environment and the virtual platform are terminated. When a non-global zone 140 is rebooted, it is brought from the Running state down to the Installed state, and then transitioned from the Installed state through the Ready state to the Running state. In effect, both the application environment and the virtual platform are terminated and restarted. These and many other tasks may be initiated and controlled by zoneadmd 162 to manage a non-global zone 140 on an ongoing basis during regular operation.

Selective Provision of Mount Information

As noted previously, in one embodiment, mount information is provided to processes running within operating system partitions (zones) in a selective manner. To enable this result to be achieved, certain acts/operations are performed during each of the four states of a non-global zone 140. The acts/operations performed in each of these states will be discussed separately below. To facilitate discussion, zone A 140(*a*) will be used as the sample zone.

Configured State

As discussed above, when a non-global zone is configured, various configuration parameters are specified for the zone, with some parameters pertaining to the file system for the zone and other parameters pertaining to other aspects of the zone. In one embodiment, the parameters pertaining to the file system include but are not limited to: (1) a path to the root directory of the file system; (2) a specification of all of the directories and subdirectories that are to be created under the root directory, and all of the files that are to be installed into those directories and subdirectories; and (3) a list of all mount points and the entities that are to be mounted onto those mount points.

In the present example of zone A 140(*a*), the following sets of information are specified: (1) the path to the root directory 322 of the file system 180(*a*) for zone A 140(*a*) is /Zones/ZoneA/Root; (2) the directories to be created are ETC 332 and USR 324, and certain packages of files are to be installed under these directories; and (3) the mount points or mount directories are A, ProcFS, and NFS, and the entities to be mounted are a floppy drive, a Proces file system (ProcFS), and a network file system (NFS), respectively.

Installed State

To transition a non-global zone from the Configured state to the Installed state, an administrator in the global zone 130 invokes an operating system utility (in one embodiment, zoneadm(1 m)), which accesses the configuration information associated with the non-global zone, and interacts with the kernel 150 to carry out the installation process. In one embodiment, the following installation operations are performed for the current example of non-global zone A 140(*a*).

Initially, using the path specification in the configuration information, the root of the file system 180(*a*) is determined to be root 322. The directories ETC 332 and USR 324 are then created under this root 322. Thereafter, all of the specified files are installed into these directories. In addition, the mount points A, ProcFS, and NFS are extracted from the configuration information. For each mount point, a mount directory is created. Thus, directories A 330, ProcFs 328, and NFS 326 are created under root 322. These directories are now ready to have entities mounted onto them.

Ready State

To transition a non-global zone from the Installed state to the Ready state, an administrator in the global zone 130 invokes an operating system utility (in one embodiment, zoneadm(1 m) again), which causes a zoneadmd process 162 to be started. In the present example with zone A 140(*a*), zoneadmd 162(*a*) is started. Once started, zondadmd 162(*a*) interacts with the kernel 150 to establish zone A 140(*a*).

In establishing zone A 140(*a*), several operations are performed, including but not limited to creating zone A 140(*a*), and maintaining a file system 180(*a*) for zone A 140(*a*). In one embodiment, in creating zone A 140(*a*), a number of operations are performed, including but not limited to assigning a unique zone ID to zone A 140(*a*), and creating a data structure associated with zone A 140(*a*). This data structure will be used to store a variety of information associated with zone A 140(*a*), including for example, the zone ID.

To maintain the file system 180(*a*) for zone A 140(*a*), the path (/Zones/ZoneA/Root) to the root directory 322 of the file system 180(*a*) is initially extracted from the configuration information for zone A 140(*a*). This directory 322 is established as the root of the file system 180(*a*) for zone A 140(*a*). This may involve, for example, storing the path to root 322 in the zone A data structure for future reference.

After the root directory 322 is determined and established, a determination is made as to whether there are any entities to be mounted. In the current example, the configuration information for zone A 140(*a*) indicates that a floppy drive is to be mounted onto directory A 330, a process file system (ProcFS) is to be mounted onto directory ProcFS 328, and a network file system (NFS) is to be mounted onto directory NFS 326. Thus, as part of maintaining the file system 180(*a*), these entities are mounted onto their respective mount points.

Figure 5:
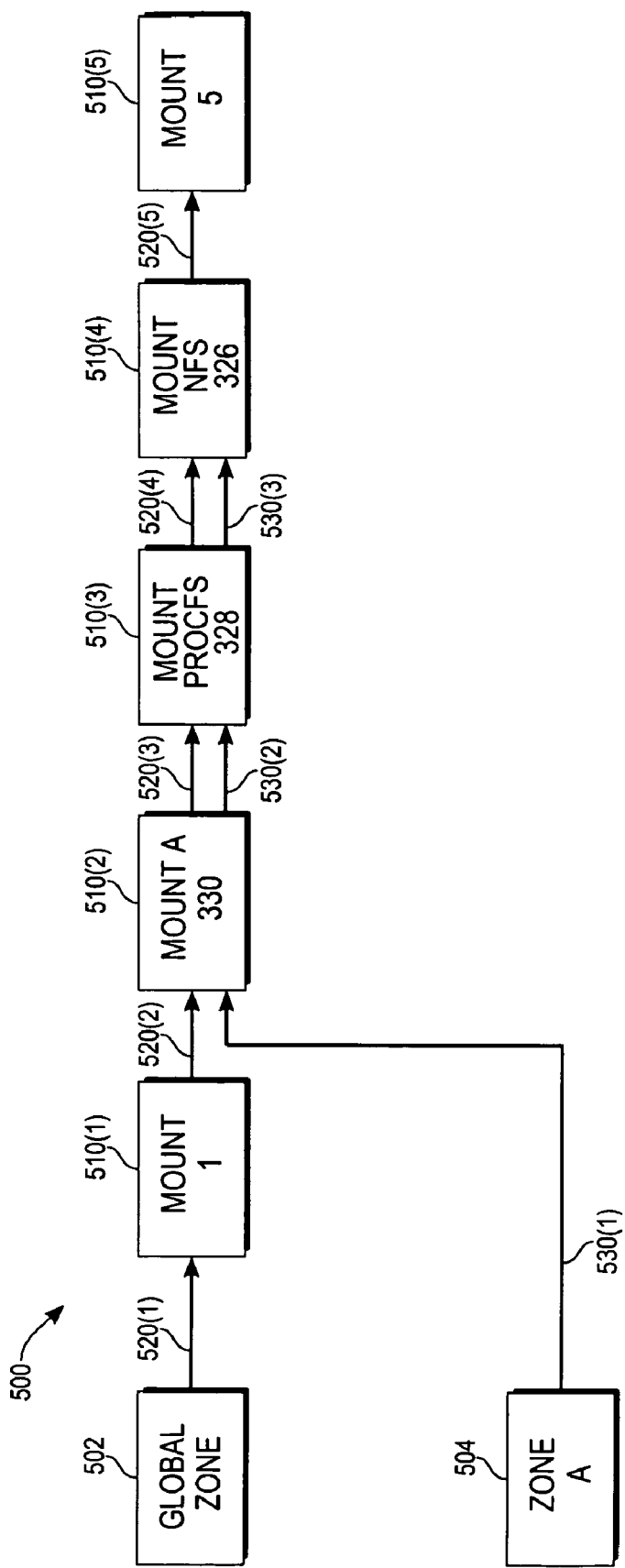
FIG. 5 shows a sample mount tracking data structure, which may be used to keep track of all the mounts in a file system, in accordance with one embodiment of the present invention.

To keep track of the mounts for future reference, one or more data structures may be maintained. FIG. 5 shows a sample data structure that may be used for this purpose. Generally, whenever an entity is mounted, it is incorporated into the overall file system maintained by the kernel 150 for the global zone 130. Thus, that mounted entity should be associated with the global zone 130. In addition, if the mounted entity is mounted within the file system of a non-global zone 140, it should also be associated with that non-global zone 140. The data structure of FIG. 5 shows how these associations may be maintained, in accordance with one embodiment of the present invention.

Specifically, whenever an entity is mounted, an entry 510 corresponding to the mount is added to a mount tracking data (MTD) structure 500. This entry comprises various sets of information pertaining to the mount, including for example, the path to the mount and certain semantics of the mount (e.g. the type of mount, etc.). In addition, the entry may also include one or more zone-specific pointers that reference a next entry. These pointers make it easy to traverse the MTD structure 500 at a later time to determine all of the mounts that are associated with a particular zone.

To illustrate how the MTD structure 500 may be maintained, a sample walk-through of the creation and maintenance of the structure 500 will now be provided. As shown, MTD structure 500 comprises a global zone entry 502. In one embodiment, this entry 502 is inserted into the MTD structure 500 when the kernel 150 is initialized. When an initial entity is mounted and hence, incorporated into the overall file system maintained for the global zone 130, a mount 1 entry 510(1) representing the initial mount is inserted. The mount 1 entry 510(*a*) comprises information, such as the information discussed previously, pertaining to the initial mount. A pointer 520(1) in the global zone entry 502 is updated to point to entry 510(1); thus, mount 1 510(1) is associated with the global zone 130. At this point, there are no other mounts in the overall file system. Thus, entry 510(1) does not point to any other entry.

Suppose now that zone A 140(*a*) is transitioned from the Installed state to the Ready state. As part of this transition, entities are mounted onto the mount points of the file system 180(*a*) for zone A 140(*a*). Specifically, a floppy drive is mounted onto mount point A 330, a process file system (ProcFS) is mounted onto mount point ProcFS 328, and a network file system (NFS) is mounted onto mount point NFS 326.

In one embodiment, when zone A 140(*a*) is created, a zone A entry 504 is inserted into the MTD structure 500. Then, when the floppy drive is mounted onto mount point A 330, a mount A entry 510(2) is added. The mount A entry 510(2) comprises information pertaining to the floppy drive mount. Upon the addition of entry 510(2), several pointers are updated. The pointer 530(1) in the zone A entry 504 is updated to point to entry 510(2); thus, the mount A entry 510(2) is associated with zone A 140(*a*). In addition, a global zone pointer 520(2) inside the mount 1 entry 510(1) is updated to point to entry 510(2). As a result, the mount A entry 510(2) is also associated with the global zone 130.

Thereafter, when the process file system (ProcFS) is mounted onto mount point ProcFS 328, a mount ProcFS entry 510(3) is added. This entry 510(3) comprises information pertaining to the ProcFS mount. Upon the addition of entry 510(3), several pointers are updated. A zone A pointer 530(2) inside the mount A entry 510(2) is updated to point to entry 510(3); thus, the mount ProcFS entry 510(3) is associated with zone A 140(*a*). In addition, a global zone pointer 520(3) inside the mount A entry 510(2) is updated to point to entry 510(3). As a result, the mount ProcFS entry 510(3) is also associated with the global zone 130.

Thereafter, when the network file system (NFS) is mounted onto mount point NFS 326, a mount NFS entry 510(4) is added. This entry 510(4) comprises information pertaining to the NFS mount. Upon the addition of entry 510(4), several pointers are updated. A zone A pointer 530(3) inside the mount ProcFS entry 510(3) is updated to point to entry 510(4); thus, the mount NFS entry 510(4) is associated with zone A 140(*a*). In addition, a global zone pointer 520(4) inside the mount ProcFS entry 510(3) is updated to point to entry 510(4). As a result, the mount NFS entry 510(4) is also associated with the global zone 130.

Suppose that, after zone A 140(*a*) is readied, another entity is mounted and hence, incorporated into the overall file system maintained for the global zone 130. When this occurs, another entry 510(5) is added to the MTD structure 500. This entry 510(5) comprises information pertaining to the mount (mount 5 in this example). When the mount 5 entry 510(5) is added, the global zone pointer 520(5) in the mount NFS entry 510(4) is updated to point to entry 510(5); thus, the mount 5 entry 510(5) is associated with the global zone 130. However, because mount 5 is not within the file system 180(*a*) of zone A 140(*a*), there is no zone A pointer in the NFS mount entry 510(4) that points to entry 510(5). Thus, mount 5 is not associated with zone A 140(*a*).

With the MTD structure 500 in place, determining all of the mounts that are associated with a particular zone (global or non-global) becomes a simple task. All that needs to be done is to follow the zone pointers in the entries 510.

Running State

To transition a non-global zone from the Ready state to the Running state, the zoneadmd process associated with the non-global zone starts an init process. In the current example, zoneadmd 162(*a*) starts the init process 172(*a*). When started, the init process 172(*a*) is associated with zone A 140(*a*). This may be done, for example, by creating a data structure for process 172(*a*), and storing the zone ID of zone A 140(*a*) within that data structure. Once started, the init process 172(*a*) looks in the file system 180(*a*) (for example, in directory ETC 332) of zone A 140(*a*) to determine what applications to run. The init process 172(*a*) then executes those applications to give rise to one or more other processes 174. In one embodiment, as each process 174 is started, it is associated with zone A 140(*a*). This may be done in the same manner as that discussed above in connection with the init process 172(*a*) (e.g. by creating a data structure for the process 174 and storing the zone ID of zone A 140(*a*) within that data structure). In the manner described, processes 170(*a*) are started and associated with (and hence, are running within) zone A 140(*a*).

During regular operation, one or more processes may submit a request to the kernel 150 for information pertaining to mounts. In one embodiment, when the kernel 150 receives such a request from a process, it determines the zone in which that process is running, which may be the global zone 130 or one of the non-global zones 140. The kernel 150 then selectively provides the mount information appropriate for processes in that zone.

For example, when the kernel 150 receives a request from one of the processes 170(*a*) running within zone A 140(*a*), the kernel 150 determines the zone in which that process 170(*a*) is running. This determination may be made, for example, by accessing the data structure associated with the process 170(*a*), and extracting the zone ID of zone A 140(*a*) therefrom. The zone ID may then be used to determine that the process 170(*a*) is running within zone A 140(*a*). After this determination is made, the kernel 150 traverses the MTD structure 500 shown in FIG. 5 to determine all of the mounts that are within the file system 180(*a*) for zone A 140(*a*). This may be done, for example, by starting with the zone A entry 504, following the pointer 530(1) in the zone A entry 504 to the mount A entry 510(2), following the zone A pointer 530(2) in the mount A entry 510(2) to the mount ProcFS entry 510(3), and following the zone A pointer 530(3) in the mount ProcFS entry 510(3) to the mount NFS entry 510(4).

After the kernel 150 determines which mounts are within the file system 180(*a*) for zone A 140(*a*), it provides information pertaining to just those mounts to the requesting process 170(*a*). Information pertaining to all of the other mounts (e.g. mount 1 and mount 5) in the overall file system is not provided. That way, the process 170(*a*) is made aware of, and hence, can view only those mounts that are within the file system 180(*a*) of the zone 140(*a*) in which the process 170(*a*) is running. In this manner, the kernel 150 enforces the file system boundary (from a mount standpoint) of a zone.

Presentation of Mount Information

One of the purposes of selectively providing mount information to a process is to create an illusion for the process that the file system associated with the zone in which the process is running is the entire file system. In one embodiment, to perpetuate this illusion, mount information is presented in a particular way.

First, most processes expect the root of a file system to be a mount (this mount may, for example, be a mount for a hard drive on which most or all of the files are stored). Because of this expectation, the kernel 150 shows the root of a file system as a mount. This is done even if the root is not actually a mount. For example, the root 322 of the file system 180(*a*) for zone A 140(*a*) is not an actual mount. Nonetheless, in one embodiment, the kernel 150 shows root 322 as a mount when responding to a request for mount information from a process 170(*a*) running within zone A 140(*a*).

Also, when information pertaining to a mount is provided, the full path to the mount may be filtered. This helps to hide the fact that the file system associated with a zone may be part of a larger overall file system. For example, the full path to the root 322 of the file system 180(*a*) for zone A 140(*a*) is /Zones/ZoneA/Root. This full path is not shown to a process 170(*a*) running within zone A 140(*a*), however. Instead, the process 170(*a*) is shown just "/" (indicating a root) so that the process 170(*a*) is kept unaware of the existence of the other directories (e.g. Zones, Zone A, etc.). Likewise, mounts 330, 328, and 326 are shown as /A, /ProcFS, and /NFS, respectively, instead of /Zones/ZoneA/Root/A, /Zones/ZoneA/Root/ProcFS, and /Zones/ZoneA/Root/NFS. By doing so, the kernel 150 perpetuates the illusion to the process 170(*a*) that the file system 180(*a*) of zone A 140(*a*) is the entire file system.

Alternative Method for Determining Mounts

It was disclosed previously that an MTD structure 500 may be constructed and used to determine the mounts that are within a particular file system associated with a particular zone. While this is an effective method, it should be noted that other methods may also be used within the scope of the present invention.

For example, instead of maintaining an MTD structure 500, a full path to each mount may be stored, and this path may be compared with the path to the root of a file system to determine whether that mount is within the file system. For example, the path to mount NFS 326 is /Zones/ZoneA/Root/NFS. The path to the root 322 of the file system 180(*a*) for zone A 140(*a*) is /Zones/ZoneA/Root. By comparing these two paths, it can be determined that mount NFS 326 is under the root of file system 180(*a*). Thus, mount NFS 326 is within file system 180(*a*). Similarly, the path to the root 422 of the file system 180(*b*) for zone B 140(*b*) is /Zones/ZoneB/Root. By comparing the path to mount NFS 326 with the path to root 422, it can be determined that mount NFS 326 is not under the root of file system 180(*b*). Thus, mount NFS 326 is not within file system 180(*b*). By comparing the path to each mount with the path to the root of a particular file system, it can be determined which mounts are under the root, and hence, are part of the file system. This and other methods may be used to determine the mounts that are within a particular file system. All such methods are within the scope of the present invention.

Hardware Overview

Figure 6:
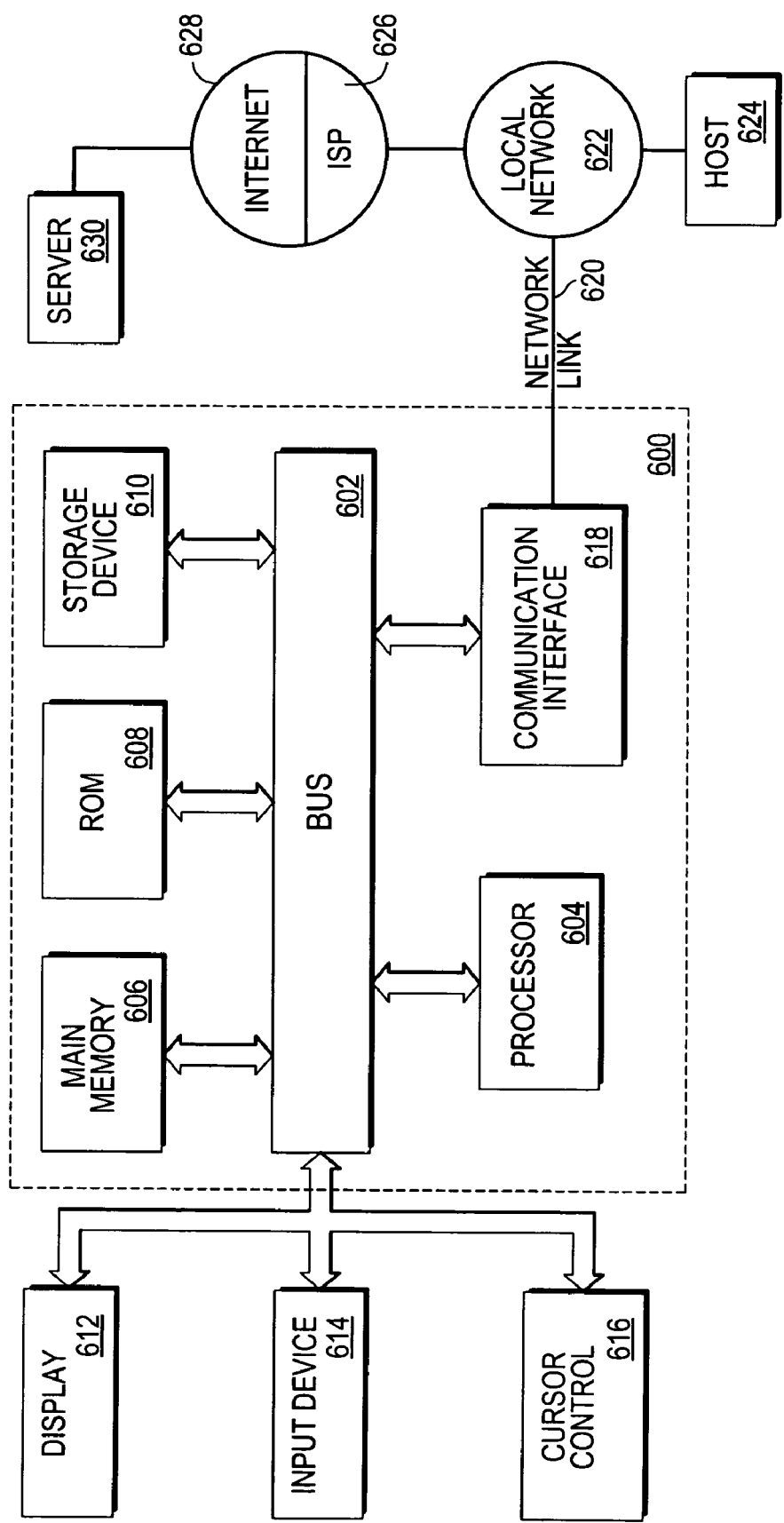
FIG. 6 is a block diagram of a general purpose computer system in which one embodiment of the present invention may be implemented.

FIG. 6 is a block diagram that illustrates a computer system 600 upon which an embodiment of the invention may be implemented. Computer system 600 includes a bus 602 for facilitating information exchange, and one or more processors 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions by processor 604. Computer system 600 may further include a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

In computer system 600, bus 602 may be any mechanism and/or medium that enables information, signals, data, etc., to be exchanged between the various components. For example, bus 602 may be a set of conductors that carries electrical signals. Bus 602 may also be a wireless medium (e.g. air) that carries wireless signals between one or more of the components. Bus 602 may also be a medium (e.g. air) that enables signals to be capacitively exchanged between one or more of the components. Bus 602 may further be a network connection that connects one or more of the components. Overall, any mechanism and/or medium that enables information, signals, data, etc., to be exchanged between the various components may be used as bus 602.

Bus 602 may also be a combination of these mechanisms/media. For example, processor 604 may communicate with storage device 610 wirelessly. In such a case, the bus 602, from the standpoint of processor 604 and storage device 610, would be a wireless medium, such as air. Further, processor 604 may communicate with ROM 608 capacitively. In this instance, the bus 602 would be the medium (such as air) that enables this capacitive communication to take place. Further, processor 604 may communicate with main memory 606 via a network connection. In this case, the bus 602 would be the network connection. Further, processor 604 may communicate with display 612 via a set of conductors. In this instance, the bus 602 would be the set of conductors. Thus, depending upon how the various components communicate with each other, bus 602 may take on different forms. Bus 602, as shown in FIG. 6, functionally represents all of the mechanisms and/or media that enable information, signals, data, etc., to be exchanged between the various components.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to machine-readable storage media (e.g. non-volatile media, volatile media, etc.), and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims.

What is claimed is:

1. A machine-implemented method, comprising:

creating, by an operating system, a plurality of non-global operating system partitions within a global operating system environment provided by the operating system, wherein each non-global operating system partition serves to isolate processes running within that non-global operating system partition from other non-global operating system partitions within the global operating system environment, wherein enforcement of boundaries between the non-global operating system partitions is carried out by the operating system, and wherein the plurality of non-global operating system partitions comprises a particular non-global operating system partition;

maintaining a file system for the particular non-global operating system partition, the file system comprising one or more mounts;

receiving a request from a process running within the particular non-global operating system partition to view information for mounts;

determining that the process is running within the particular non-global operating system partition; and providing to the process information for only those mounts that are within the file system for the particular non-global operating system partition.

2. The method of claim 1, wherein the file system for the particular non-global operating system is part of an overall file system maintained for the global operating system environment, and wherein the overall file system comprises one or more other mounts that are not within the file system for the particular non-global operating system partition.

3. The method of claim 1, wherein maintaining comprises:
associating the one or more mounts with the particular non-global operating system partition.

4. The method of claim 3, wherein the particular non-global operating system partition has a mount data tracking structure associated therewith, and wherein associating comprises:
adding entries corresponding to the one or more mounts to the mount data tracking structure associated with the particular non-global operating system partition.

5. The method of claim 4, wherein the mount data tracking structure associated with the particular non-global operating system partition comprises a linked list of mount entries.

6. The method of claim 4, wherein providing comprises:
accessing the mount data tracking structure associated with the particular non-global operating system partition; and
determining, based upon the mount data tracking structure associated with the particular non-global operating system partition, the one or more mounts within the file system for the particular non-global operating system partition.

7. The method of claim 1, wherein the file system for the particular non-global operating system partition has a root directory, and wherein providing comprises:
determining which mounts are within the file system for the particular non-global operating system partition by determining which mounts are under the root directory, or a subdirectory thereof.

8. The method of claim 1, wherein:
the operating system isolates the process within the particular non-global operating system partition by not allowing the process to access processes running in any other non-global operating system partition.

9. The method of claim 1, wherein creating comprises assigning a unique identifier to the particular non-global operating system partition.

10. The method of claim 9, wherein determining comprises:
extracting, from a data structure associated with the process, a partition identifier; and
using the partition identifier to determine the particular non-global operating system partition.

11. The method of claim 1, wherein the file system for the particular non-global operating system partition has a root directory, and wherein providing comprises:
indicating to the process that the root directory is one of the one or more mounts.

12. The method of claim 1, wherein the file system for the particular non-global operating system partition has a root directory, wherein the root directory has an associated path, wherein each of the one or more mounts is under the root directory, or a subdirectory thereof, and wherein providing comprises:
showing, to the process, each of the one or mounts without including the path to the root directory.

13. An apparatus, comprising:
one or more processors; and
a storage having stored therein instructions which, when executed by the one or more processors, cause the one or more processors to perform the operations of:
implementing an operating system that creates a plurality of non-global operating system partitions within a global operating system environment provided by the operating system, wherein each non-global operating system partition serves to isolate processes running within that non-global operating system partition from other non-global operating system partitions within the global operating system environment, wherein enforcement of boundaries between the non-global operating system partitions is carried out by the operating system, and wherein the plurality of non-global operating system partitions comprises a particular non-global operating system partition;
maintaining a file system for the particular non-global operating system partition, the file system comprising one or more mounts;
receiving a request from a process running within the particular non-global operating system partition to view information for mounts;
determining that the process is running within the particular non-global operating system partition; and
providing to the process information for only those mounts that are within the file system for the particular non-global operating system partition.

14. The apparatus of claim 13, wherein the file system for the particular non-global operating system partition is part of an overall file system maintained for the global operating system environment, and wherein the overall file system comprises one or more other mounts that are not within the file system for the particular non-global operating system partition.

15. The apparatus of claim 13, wherein maintaining comprises:
associating the one or more mounts with the particular non-global operating system partition.

16. The apparatus of claim 15, wherein the particular non-global operating system partition has a mount data tracking structure associated therewith, and wherein associating comprises:
adding entries corresponding to the one or more mounts to the mount data tracking structure associated with the particular non-global operating system partition.

17. The apparatus of claim 16, wherein the mount data tracking structure associated with the particular non-global operating system partition comprises a linked list of mount entries.

18. The apparatus of claim 16, wherein providing comprises:
accessing the mount data tracking structure associated with the particular non-global operating system partition; and
determining, based upon the mount data tracking structure associated with the particular non-global operating system partition, the one or more mounts within the file system for the particular non-global operating system partition.

19. The apparatus of claim 13, wherein the file system for the particular non-global operating system partition has a root directory, and wherein providing comprises:
    determining which mounts are within the file system for the particular non-global operating system partition by determining which mounts are under the root directory, or a subdirectory thereof.

20. The apparatus of claim 13, wherein the operating system isolates the process within the particular non-global operating system partition by not allowing the process to access processes running in any other non-global operating system partition.

21. The apparatus of claim 13, wherein implementing the operating system comprises assigning a unique identifier to the particular non-global operating system partition.

22. The apparatus of claim 21, wherein determining comprises:
    extracting, from a data structure associated with the process, a partition identifier; and
    using the partition identifier to determine the particular non-global operating system partition.

23. The apparatus of claim 13, wherein the file system for the particular non-global operating system has a root directory, and wherein providing comprises:
    indicating to the process that the root directory is one of the one or more mounts.

24. The apparatus of claim 13, wherein the file system for the particular non-global operating system partition has a root directory, wherein the root directory has an associated path, wherein each of the one or more mounts is under the root directory, or a subdirectory thereof, and wherein providing comprises:
    showing, to the process, each of the one or mounts without including the path to the root directory.

25. A machine-readable storage medium, comprising:
    instructions for causing one or more processors to implement an operating system that creates a plurality of non-global operating system partitions within a global operating system environment provided by the operating system, wherein each non-global operating system partition serves to isolate processes running within that non-global operating system partition from other non-global operating system partitions within the global operating system environment, wherein enforcement of boundaries between the non-global operating system partitions is carried out by the operating system, and wherein the plurality of non-global operating system partitions comprises a particular non-global operating system partition;
    instructions for causing one or more processors to maintain a file system for the particular non-global operating system partition, the file system comprising one or more mounts;
    instructions for causing one or more processors to receive a request from a process running within the particular non-global operating system partition to view information for mounts;
    instructions for causing one or more processors to determine that the process is running within the particular non-global operating system partition; and
    instructions for causing one or more processors to provide to the process information for only those mounts that are within the file system for the particular non-global operating system partition.

26. The machine-readable storage medium of claim 25, wherein the file system for the particular non-global operating system is part of an overall file system maintained for the global operating system environment, and wherein the overall file system comprises one or more other mounts that are not within the file system for the particular non-global operating system partition.

27. The machine-readable storage medium of claim 25, wherein the instructions for causing one or more processors to maintain comprises:
    instructions for causing one or more processors to associate the one or more mounts with the particular non-global operating system partition.

28. The machine-readable storage medium of claim 27, wherein the particular non-global operating system partition has a mount data tracking structure associated therewith, and wherein the instructions for causing one or more processors to associate comprises:
    instructions for causing one or more processors to add entries corresponding to the one or more mounts to the mount data tracking structure associated with the particular non-global operating system partition.

29. The machine-readable storage medium of claim 28, wherein the mount data tracking structure associated with the particular non-global operating system partition comprises a linked list of mount entries.

30. The machine-readable storage medium of claim 28, wherein the instructions for causing one or more processors to provide comprises:
    instructions for causing one or more processors to access the mount data tracking structure associated with the particular non-global operating system partition; and
    instructions for causing one or more processors to determine, based upon the mount data tracking structure associated with the particular non-global operating system partition, the one or more mounts within the file system for the particular non-global operating system partition.

31. The machine-readable storage medium of claim 25, wherein the file system for the particular non-global operating system partition has a root directory, and wherein the instructions for causing one or more processors to provide comprises:
    instructions for causing one or more processors to determine which mounts are within the file system for the particular non-global operating system partition by determining which mounts are under the root directory, or a subdirectory thereof.

32. The machine-readable storage medium of claim 25, wherein the operating system isolates the process within the particular non-global operating system partition by not allowing the process to access processes running in any other non-global operating system partition.

33. The machine-readable storage medium of claim 25, wherein the instructions for causing one or more processors to implement the operating system comprises instructions for causing one or more processors to assign a unique identifier to the particular non-global operating system partition.

34. The machine-readable storage medium of claim 33, wherein the instructions for causing one or more processors to determine comprises:
    instructions for causing one or more processors to extract, from a data structure associated with the process, a partition identifier; and
    instructions for causing one or more processors to use the partition identifier to determine the particular non-global operating system partition.

35. The machine-readable storage medium of claim 25, wherein the file system for the particular non-global operating system partition has a root directory, and wherein the instructions for causing one or more processors to provide comprises:
   instructions for causing one or more processors to indicate to the process that the root directory is one of the one or more mounts.

36. The machine-readable storage medium of claim 25, wherein the file system for the particular non-global operating system partition has a root directory, wherein the root directory has an associated path, wherein each of the one or more mounts is under the root directory, or a subdirectory thereof, and wherein the instructions for causing one or more processors to provide comprises:
   instructions for causing one or more processors to show, to the process, each of the one or mounts without including the path to the root directory.

* * * * *